Patented Feb. 7, 1939

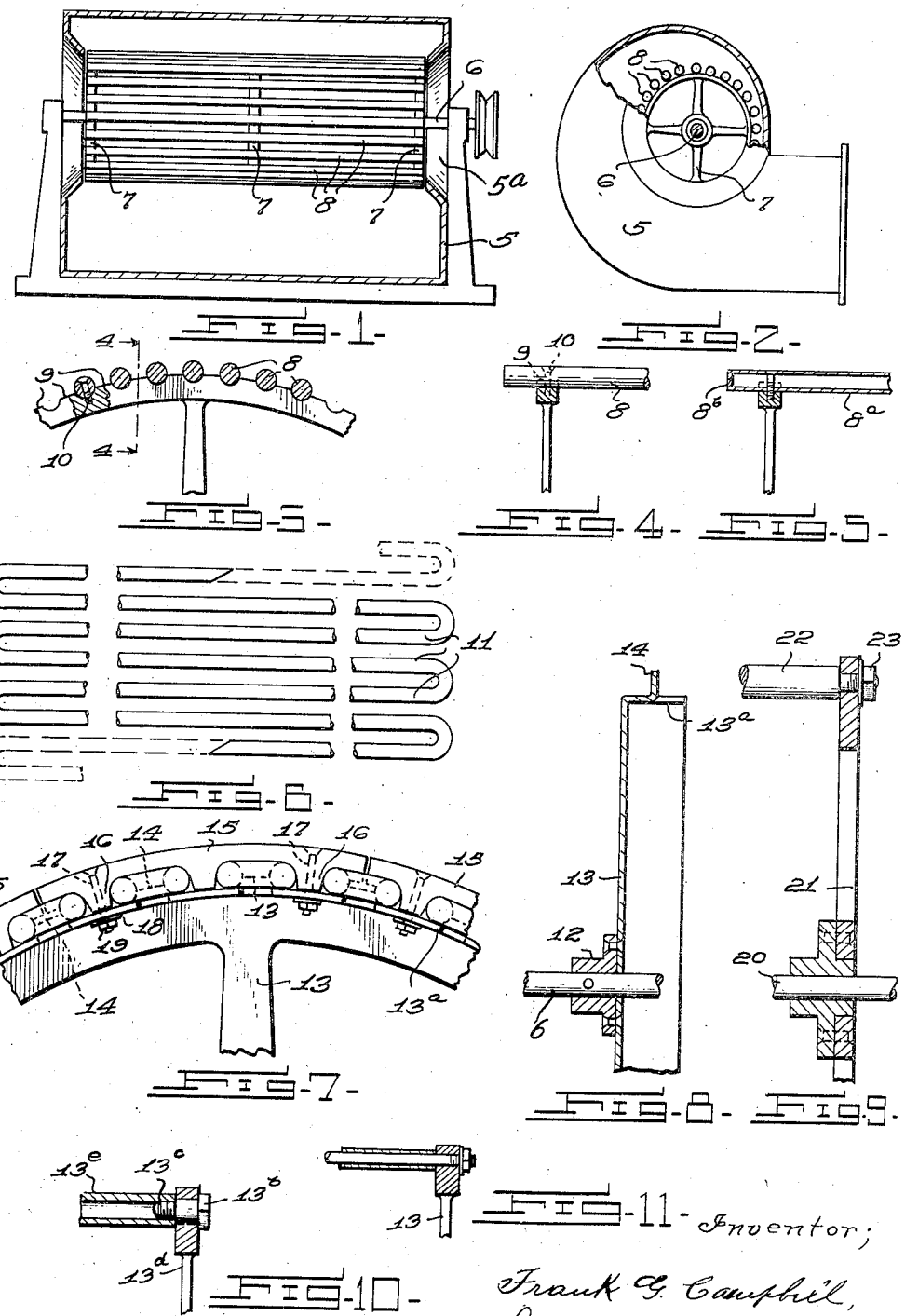

2,145,969

UNITED STATES PATENT OFFICE 2,145,969

CAGE TYPE ROTOR FOR BLOWER FANS

Frank G. Campbell, Arlington, Va.

Application November 12, 1936, Serial No. 110,521

16 Claims. (Cl. 230—134)

This invention relates to fans of the blower type, such as are commonly used for inducing forced air through the ducts of ventilating and air conditioning apparatus, kilns, and the like.

More specifically, the invention relates to the improvement of fans of the cage type and it has for its object to provide a fan of this character constituting a marked improvement in the art from the standpoint of efficiency and quietness in operation and economy in manufacture.

In the accompanying drawing:

Figure 1 is a transverse sectional view through a fan constructed in accordance with the invention;

Fig. 2 is a longitudinal sectional view therethrough;

Fig. 3 is an enlarged fragmentary sectional view of a portion of the cage or rotor constructed in accordance with the invention;

Fig. 4 is a sectional view on line 4—4 of Fig. 3;

Fig. 5 is a view like Fig. 4 but illustrating a tubular bar in lieu of the solid bars of Fig. 3;

Fig. 6 is a detail view illustrating one method of forming the bars of the cage by the mere bending back and forth of a single piece of material circular in cross section;

Fig. 7 is an enlarged end view illustrating the mat of Fig. 6 brought to curved form and mounted upon a spider;

Fig. 8 is a detailed sectional view illustrating a method of forming the spiders;

Fig. 9 is a detail sectional view illustrating another method of securing the bars to a spider;

Fig. 10 is a sectional view illustrating still another method of securing the bars to a spider, and Fig. 11 is a fragmentary sectional view illustrating a further modification of the invention.

Like numerals designate corresponding parts throughout the several figures of the drawing.

It is common practice in the art to which this invention relates to provide a casing 5 of the general form of that illustrated in Fig. 2 and to mount therein a driven rotor consisting of a shaft 6, suitable spiders 7 and a large number of longitudinally extending bars secured to and bodily rotating with said spiders.

In this type of fan, air is drawn endwise into the open ends of the rotor through the openings 5ª in the sides of the casing 5.

The present invention resides in providing a rotor in which these bars are in the form of members 8 that are substantially cylindrical. In Fig. 3 these members have been illustrated as being solid bars and the spiders 7 have been illustrated as being provided with projections 9 much like sprocket teeth which automatically position and space the bars upon the spiders. This renders it unnecessary for the workmen assembling the rotor to accurately measure to position each bar. The projections 9 are formed upon the spider at the time of manufacture of the latter, and the resultant spider looks much like an ordinary sprocket wheel. Any suitable means may be employed for holding the bars upon the spiders, such, for example as the machine screws indicated at 10, which pass through the bars 8 and into the spider. Instead of making the bars solid, they may be made of tubular material, as indicated at 8ª in Fig. 5. In this case, the ends of these tubes will be closed, as indicated at 8ᵇ, to prevent whistling or other noise induced by the passage of air into the tubes. To provide for very quick assembly and very great economy in the manufacture, I may form the assemblage of bars by bending a piece of stock 11, of suitable diameter, back and forth in a series of U-bends, as illustrated in Fig. 6, to mat form.

While it would be possible to make this mat of such length that it could be brought to the form of a complete cylinder and then secured upon supporting spiders, this would necessitate the handling of a very long piece of stock. Therefore, I prefer to use shorter mats and to secure a plurality of these mats about the spiders to make up a complete cage.

It will be convenient, for example, to make a mat of such width as to cover about sixty degrees of the circle represented by the spiders or carriers. The carriers may be formed as illustrated in Fig. 8, where the shaft 6 is shown as having a hub 12 mounted thereon to which a sheet metal spider 13 is riveted or otherwise secured. Tapered spacing lugs 14 are struck out of the horizontal flange of this spider. There are at least two of these spiders upon the shaft and there may be a third one at the center of the shaft to further aid in stiffening the structure. In assembling the parts one of the mat segments is placed upon the spiders with the teeth or lugs 14 projecting into each alternate space between the several bars. Holding cleats 15 are then placed over the bars, said cleats being provided with teeth 16 which project into the spaces between the bars not occupied by the lugs 14. Screws 17 are passed through the cleats and through the horizontal flange 13ª of spider 13, said screws being engaged upon the under side of said flange by washers 18 and nuts 19. Another mat segment is then placed upon another section of the spiders and the foregoing operation is repeated. It will be observed that the free ends of the circular bars or tubes constituting the mat segments, terminate at the center line of the cage and these ends may be secured together by welding or by having them overlap the center spider in such manner that the act of placing the cleat 15 in position upon said center spider will bind these abutting ends in place.

Another method of assembling the parts has been illustrated in Fig. 9 where the shaft 20 carries a spider 21 and the bars 22 are provided with reduced threaded ends which pass through said spider and receive nuts 23.

In Fig. 11 the bar is of tubular formation and a rod passes therethrough and through the spiders, and nuts upon the rods bind the spiders against the ends of the tubular bars.

Another method of forming the structure is illustrated in Fig. 10 wherein the spider 13$^d$ is traversed by cap screws 13$^b$, the inner ends of which are threaded to engage internal threads 13$^c$ of the tubular bar 13$^e$. As is evident from the various forms illustrated, a great many ways may be devised for building up the rotor of a cage type fan and I wish it to be understood that the invention is not limited to any particular way of constructing this unit. The invention resides broadly in the idea of substituting for the many irregular and angularly shaped bars; heretofore employed; bars which are substantially circular in cross section. At first glance it might seem that circular bars would not give an impulse to the air in any particular direction. However, actual experiment has shown that bars of this shape will yield a very high degree of efficiency. The outward impulse given to a body of air by a cage type fan does not arise wholly from the shape of the bars employed upon the fan but arises in large measure from the fact that the rotation of a cage of this sort starts the whole body of air within the rotor into whirling motion, and the air has sufficient weight to yield to the action of centrifugal force and tend to flow rapidly outward when thus converted into a whirling mass.

Actual tests by those skilled in aerodynamics show that while a tear-shaped body presents the least resistance to the passage of air, a circular body sets up almost as much, if not more, disturbance, than any other form that can be devised. The vacuum created in the rear of a truly circular body is very great. Further, as far as actual thrust against the air is concerned, it will be observed that the forward upper quarter will tend to thrust the air outwardly, while the entire rear half of the surface will tend to create a vacuum in the rear of the bar. This, combined with the centrifugal flow of air from the interior of the rotor, yields a fan of very high efficiency.

This fan is not only very economical to make and assemble, but it is very quiet in operation. Note that the bar ends of the bend form do not present any sharp surfaces which would tend to create noise as the rotor revolves.

It will be observed that the air moving bars herein shown and described present convex faces in cross section at all points of their circumference and that they are free of sharp angles at every point in their circumference. It is this arrangement of surfaces which yields the greatest air agitating effect without inducing whistling, humming, or other objectionable noises in the fan.

It is to be understood that the invention is not limited to the precise construction as set forth in the drawing or description, but that it includes within its purview whatever changes fairly come within either the terms or the spirit of the appended claims.

Having described my invention, what I claim is:

1. A cage type rotor for a blower fan comprising a carrier and a multiplicity of longitudinally extending fixed bars thereon that are substantially cylindrical and are held against rotation upon their axes.

2. A rotor of the character described comprising a multiplicity of cylindrical bars, a plurality of spiders, and means for fixedly securing said bars to said spiders to hold said bars against rotation upon their axes.

3. In a rotor for a cage type fan, a plurality of spiders, a group of substantially cylindrical bars disposed therearound, spacing means carried by the spiders, and means for clamping the bars to the spiders fixedly and against rotation upon their axes.

4. A structure as recited in claim 3 wherein the clamping means is provided with spacing elements which enter between said bars.

5. The combination with a shaft, a plurality of spiders carried thereby, a mat formed of a piece of cylindrical stock bent back and forth to form a group of bars connected by U-bends, and means for securing said mat to said spiders.

6. A structure as recited in claim 5 in combination with spacing means carried by the spider which enter between said bars.

7. A structure as recited in claim 5 in combination with cleats for clamping said bars to the spiders.

8. A structure as recited in claim 5, in combination with cleats for clamping said bars to the spiders, said cleats being provided with spacing members which enter between said bars.

9. In combination a rotor comprising a shaft, spiders carried thereby, substantially cylindrical bars extending between and lying wholly between said spiders to form a cage, means for fixedly securing the ends of said bars against axial rotation to the spiders, a fan casing, and means for mounting said rotor for rotation in said casing.

10. A structure as recited in claim 9, wherein said securing means comprises screws which pass through the spiders and wherein said bars are provided with internal threads with which said screws are engaged.

11. A structure as recited in claim 9, wherein said securing means comprises screws which pass through the spiders and wherein said bars are provided with internal threads with which said screws are engaged, said bars being of tubular formation.

12. A rotor for blower fans comprising, a shaft, spiders carried thereby, tubular cylindrical bars extending between said spiders, rods passing through said tubes and through said spiders, means engaged with the outer ends of said rods for binding the spiders against the ends of said bars to hold said bars against rotation upon their axes, a fan casing, and means for mounting said rotor for rotation in said casing.

13. In combination, a rotor comprising a rotative carrier, a mat formed of a piece of substantially cylindrical stock bent back and forth to form a group of bars connected by relatively short U-bends at their ends, means for securing said mat of bars to the carrier, a fan casing, and means for mounting said rotor for rotation in said casing.

14. A fan rotor comprising a rotative carrier, a plurality of segmental mats, each consisting of a group of bars formed of a piece of cylindrical stock bent back and forth, with connecting bends at their ends, clamps shaped to fit upon said bars and hold them into engagement with the carrier, securing means for said clamps, a fan casing, and means for mounting said rotor in said casing.

15. A blower fan comprising a fan casing having an opening in at least one of its sides, and an open ended rotor mounted for rotation in said casing into which air is drawn through said opening of the casing, said rotor comprising a rotative support and a plurality of cylindrical bars fixed against rotation upon their axes upon said support, said bars lying in spaced relation to each other, the air drawn endwise into the interior of said rotor being expelled outwardly between said bars.

16. A blower fan comprising a fan casing having an opening in at least one of its sides and an open-ended rotor mounted for rotation in said casing, into which air is drawn through said opening of the casing, said rotor comprising a rotative support and a plurality of bars fixed against rotation upon their axes upon said support, said bars lying in spaced relation to each other, the air drawn endwise into the interior of said rotor being expelled outwardly between said bars, and said bars being of such configuration in cross section as to present convex surfaces at all points about their peripheries.

FRANK G. CAMPBELL.